(12) United States Patent
Feehan et al.

(10) Patent No.: US 7,239,589 B2
(45) Date of Patent: Jul. 3, 2007

(54) METHOD AND APPARATUS FOR DESTRUCTING AN OPTICAL DISC

(75) Inventors: Thomas John Feehan, Ventura, CA (US); Patrick John Shevlin, Thousand Oaks, CA (US); John Noel Hodnett, Thousand Oaks, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 590 days.

(21) Appl. No.: 10/612,378

(22) Filed: Jul. 1, 2003

(65) Prior Publication Data

US 2004/0125722 A1 Jul. 1, 2004

Related U.S. Application Data

(60) Provisional application No. 60/394,520, filed on Jul. 9, 2002.

(51) Int. Cl.
*G11B 7/00* (2006.01)
(52) U.S. Cl. .................. 369/53.22; 369/103; 369/53.18
(58) Field of Classification Search ............. 369/53.22, 369/103, 53.18; 347/264
See application file for complete search history.

(56) References Cited

U.S. PATENT DOCUMENTS

| | | | | |
|---|---|---|---|---|
| 4,451,915 A | * | 5/1984 | LaBudde et al. | 369/129 |
| 4,556,946 A | * | 12/1985 | Taniguti | 702/58 |
| 5,175,719 A | | 12/1992 | Iimura | |
| 5,345,436 A | * | 9/1994 | Higuchi | 369/282 |
| 5,400,319 A | * | 3/1995 | Fite et al. | 369/275.5 |
| 6,039,637 A | * | 3/2000 | Hutchison et al. | 451/271 |
| 6,189,446 B1 | | 2/2001 | Olliges et al. | |
| 6,338,933 B1 | | 1/2002 | Lawandy et al. | |

* cited by examiner

*Primary Examiner*—Wayne Young
*Assistant Examiner*—Van T. Pham
(74) *Attorney, Agent, or Firm*—Joseph J. Laks; Robert D. Shedd; Reitseng Lin

(57) ABSTRACT

A method and apparatus renders an optical disk unplayable on a customer's optical disc playback machine. A portion of the information bearing surface of the optical disc or the light reflected therefrom, is altered for data destruction from a predetermined area, i.e., a "Table of Contents" (TOC), in order to make the disc unplayable on the playback machine of the customer.

6 Claims, 3 Drawing Sheets

METHOD AND APPARATUS FOR DESTRUCTING AN OPTICAL DISC

CROSS-REFERENCE TO RELATED APPLICATIONS

Priority is claimed from U.S. provisional patent application 60/394,520, filed Jul. 9, 2002.

FIELD OF THE INVENTION

The present invention relates to a method and apparatus for processing recording or playback medium, and more particularly, to a method for rendering an optical disc unplayable on an unintended player.

BACKGROUND

In the field of recording of information signals, a variety of disc-shaped recording media, such as optical discs or magneto-optical discs, utilizing optical or magneto-optical signal recording/reproducing methods, have been developed and are present on the market. These planar disc-shaped recording media include but not limit to read-only-memory (ROM) type recording media, such as compact discs (CDs) of various kinds, and DVD discs of various kinds, wherein video and audio materials are stored either compressed or uncompressed. These various types of CDs, VCDs, DVDR, or DVDs are included by the term optical disc(s).

With an optical disc recording/reproducing apparatus, the rotational speed of a spindle of a disc driving device adapted for rotating the optical disc is controlled for rotating the optical disc at either a constant angular velocity (CAV) or the much more common constant linear velocity (CLV) for a constant bit error rate (BER). The optical disc rotated by the disc driving device is irradiated with a laser light from a semiconductor laser enclosed within the optical head, and the laser light reflected back from the optical disc is detected by a photodetector enclosed within the optical head for reading the information from the optical disc.

In order that the laser light radiated from the semiconductor laser may be correctly converged on the signal recording surface of the disc and is able to follow the recording track formed on the optical disc in the correct manner, the optical head also performs focusing control and tracking control for the laser light on the basis of the detected output of the photodetector.

A single-sided, single (reflective) layer optical disc comprises several layers, the first of which is a layer of a clear layer made of polycarbonate or a similarly serving material. The polycarbonate layer forms the basic substrate for the optical disc. The next layer is a thin layer of a reflective metal film disposed on the upper side of the polycarbonate first layer. This reflective layer is the recording media in the optical disc made up of reflective islands and pits. Above the metal layer is a label layer, which often consists of silk-screened ink and a protective lacquer coat, and forms the top surface of the optical disc. An aperture is used to position and spin the optical disc in recording and playback operations. It should be noted that the reflective metal layer and the label layer are generally very thin in comparison with the polycarbonate substrate layer.

A bottom view of the reflective layer of a single-sided, single layer optical disc shows what appears to be a plurality of rings. These rings are actually a single, tightly-wound spiral. The single spiral is located on the top surface of the metallic reflective layer, but is visible only from the lower side, through the clear polycarbonate substrate.

To read information contained on a single-sided, single layer optical disc, the optical disc is placed in a player and rotated about the disc central axis; the disc central axis coinciding with the center of the disc aperture. A laser beam is directed to illuminate precisely-selected portions of the spiral. The beam is typically directed from under the optical disc. More particularly, the laser beam passes through the clear polycarbonate substrate of the optical disc and travels to the reflective metal layer.

Information is recorded onto optical discs by forming small pits and lands, at desired locations along the single spiral. During playback, the pits and lands are "read" by detecting laser light reflected from these pits and lands. Upon the laser beam striking the reflective metal layer, the laser beam illuminates information-carrying indentations located thereupon. In turn, portions of the laser beam are reflected back to an optical sensor, which produces an electrical output that varies in accordance with the reflected laser beam.

A single-sided, single layer optical disc generally includes three areas at the beginning of the spiral: a lead-in area, a volume structure area, and a file structure area. The three areas are normally called the table of contents of the optical disc. The remaining spiral is used for saving contents such as movies.

Other types of optical discs such as single-sided, double layer; double-sided, double layer optical discs operate with a similar principle. A single-sided, double layer optical disc, for example, includes two reflective layers, both read from the same side. As such, the capacity of a single-sided, double layer optical disc is almost twice of a single-sided, single layer optical disc.

Assembly lines for the production of optical discs, e.g., DVDs, are well known and established. Considering the great proliferation of the titles of DVDs, there is a concern that a non-conforming (wrongly subject/titled) DVD will find itself in the wrong production line even though discs are inspected for content that the correct disc is being used for a particular order. However, despite precautions, if an incorrect disc does make it's way to the end of the production line and is incorrectly shipped to a customer in a wrong shipping container with a wrong title, the disc may be viewed by a customer with age or mental sensitivities, e.g., a child or a religious person, unintentionally viewing a optical disc intended for an adult audience, e.g., having offensive violence or language content for that particular viewer.

Prior art precautions have included having the assembly machine place the incorrect disc into the package and then rejecting the package at the outfeed of the machine. However there is still a possibility that the package machine operators could by mistake reintroduce the rejected package into the acceptable packaged product line, i.e., to contaminate the product line. As such, once there is a determination of the disc being improper, the disc, at a minimum, should be made unplayable on a consumer's playback machine.

In this respect, the total destruction of data including the contents and the table of contents on an optical disc as shown in U.S. Pat. Nos. 6,039,637, 6,189,446 and 6,338,933 certainly prevents a non-conforming optical disc from reaching a customer. However, the total destruction renders future determination of the root cause of the occurrence of the non-conforming optical discs difficult if not impossible. Thus, it is desirable to provide apparatus and method therefor for assuring that the title or other identification label of an optical disc conforms with the title or other identification label of its shipping container, and if not, that the optical disc be made unplayable on the playback machine of a unintended user without totally destroying the non-conforming discs. An unintended user as used herein means a user receiving an optical disk with a subject and/or title different from what the user is expecting.

SUMMARY OF THE INVENTION

It is observed that if an optical disc is unreadable to a generally available optical disc player but with most of the contents not damaged, a consumer is generally unable to read the undamaged portion of the contents. It is also observed that a generally available optical disc player usually first reads the data in the lead-in, volume structure, and file structure areas of an optical disc. The optical disc player proceeds to read contents included in the disc only if the reading of those three areas is successful. Here, the data in all of the three areas and other areas that an optical disc player should successfully read before accessing the contents are defined as the table of contents of that optical disc.

According to the principles of the invention, an optical disc has optical information written on it but a portion of the table of contents is damaged but leaving the contents significantly undamaged, so that the optical disc is rendered unreadable to an unintended user. For example, a portion of the table of contents is removed by a punch.

An optical disc normally includes an identifier. Using the identifier and applying the principles of the invention, one can produce optical discs such that non-conforming optical discs are rendered unreadable to an unintended user. The method according to the principles of the invention includes the steps of writing optical information to an optical disc, comparing the identifier of the optical disc with a reference, and if there is no match, rendering a portion of the table of contents of the optical disc unreadable.

DETAILED DESCRIPTION

Although a 120-millimeter single-sided, single layer DVD is used as an example for illustrating the principles of the invention, the principles can be applied to other types and sizes of optical discs such as single-sided, double layer DVD and DVDR, double-sided, double layer DVDs, CD (compact disc), and VCD (video compact disc).

Destruction or damage as defined herein as any damage made to the disc that prevents a laser or other appropriate device from reading a portion of the information stored within a designated portion of the disc. For example, one way to destroy a portion of the information is removing the reflective layer at that portion so that the laser beam directed to these pits and lands is no longer reflected back properly to the optical sensor for that portion of the substrate and reflective surface, or that some material or distortion of the effected portion either blocks light from the laser or interferes with laser light reflection. These changes would make retrieval of data carried by the information bearing portion of the reflective surface of the optical disc impossible by a consumer playback machine. As presented herein, such "destroyed" data or interfered with data is necessary for the playback machine to properly read the disc and without such data, which is usually presented at the beginning inside portion of the disc, the playback machine cannot learn the characteristics of the disc necessary for proper processing of the disc.

The destruction of information according to the present invention is effective for a wide variety of optical discs, regardless of the material used to form the protective first layer or the second reflective layer.

Figure 1:
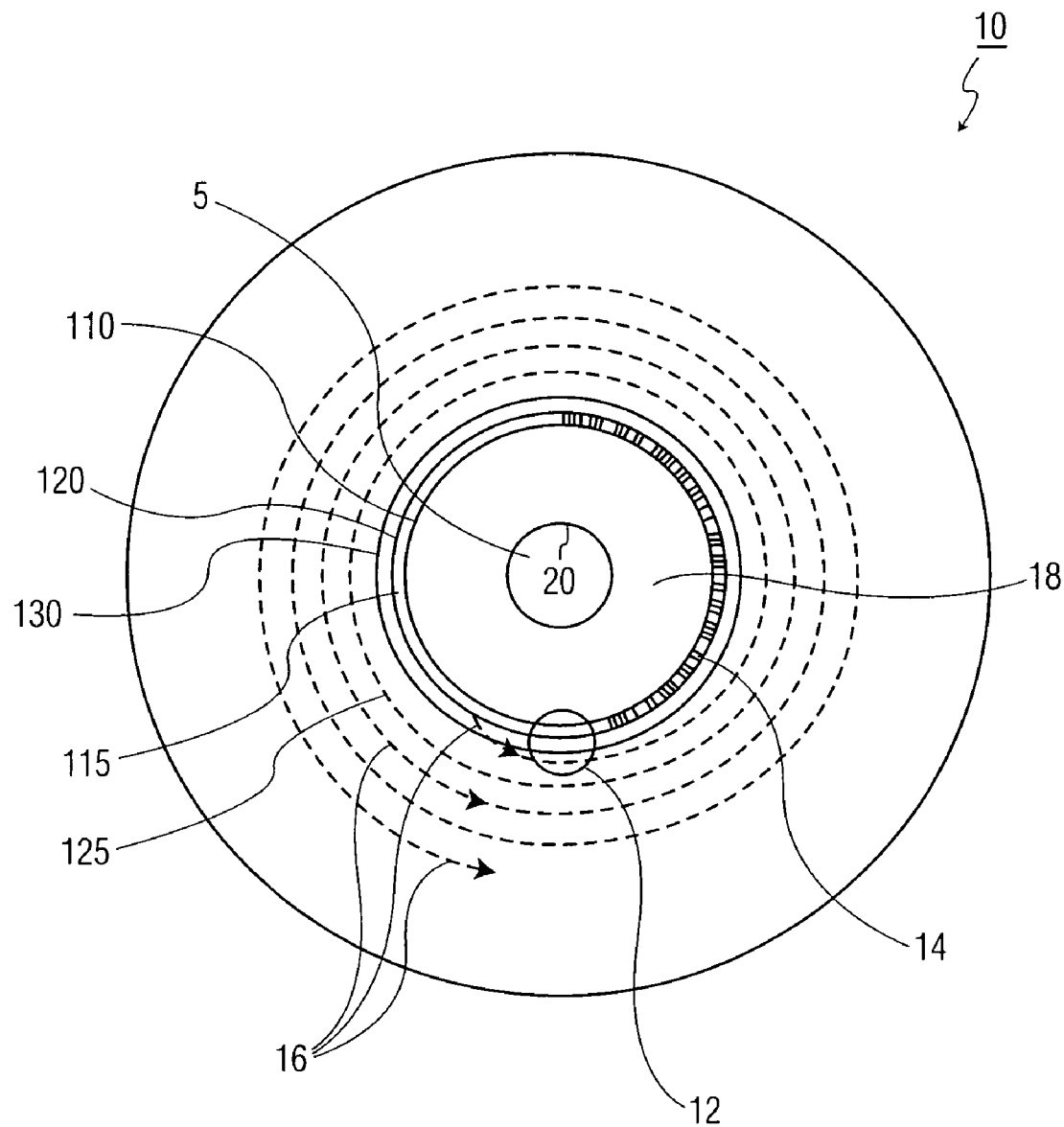
FIG. 1 shows an optical disc according to the principles of the invention, wherein a portion of a TOC is removed leaving an aperture in place of the deleted portion.

FIG. 1 shows an exemplary DVD 10 according to the principles of the invention, where the table of contents (TOC) includes lead-in area 115, volume structure area 125, and file structure area (not shown). A hole 12 punched in DVD 10 includes a portion of the TOC. The TOC information discussed above is disposed at the inner portion of spiral 16. As explained hereinabove, the advantage of this system is that if disc 10 does somehow get to an end user, disc 10 will not be playable by the end user.

What is necessary is to make a part of the TOC information necessary to playback the DVD garbled, unavailable or unreadable. Some other ways would be to inhibit a portion of the first layer to the clear passage of light, e.g., by the application of a high heat tool to deform the clarity of the top layer, or to place a quick drying drop of an appropriate material, e.g., acid (which would be messy and require a drying time). Alternately, a small application of an opaque material, such as dense ink, can be used. However, a further and surer alternative is to remove a small portion of the reflectivity layer within the TOC area, e.g., to use a drill to place a physical hole in the disc. However, the preferred embodiment is to punch a hole through the disc in the TOC area as shown in FIG. 1 in order to physically remove the portion of the appropriate portion of the reflectivity layer. Provisions should be made for the disposal of the rendered unplayable disc and the particle remnants from the destruction of the TOC.

Since only a portion of the table of contents is damaged, significant portion of the contents are undamaged, such that the structure of the DVD is reserved except for the damaged portion, which may be physically removed. An advantage of maintaining the structure is that any storage apparatus for an undamaged DVD such as a DVD holder can be used for a damaged DVD as well. This way, a damaged DVD can be stored in a regular DVD storage and later retrieved for analysis.

DVD 10 includes a burst cutting area (BCA) 115 near hub 20 of DVD 10 for saving an identification code 14 for DVD 10, which is similar to a bar code or can be a digital numerical identifier conventionally written into the disc by printing, embossing, or molding. The BCA 115 is in the area bounded by circles 110 and 120 generally having radii of 22.3 millimeters (mm) and 23.5 mm, respectively, with respect to the disc central axis of DVD 10. The identification code is typically located on an inside portion 18 of disc 10 close to a hub 20, or can be on any non-data containing portion of disc 10. Determining whether the disc is a conforming disc is done by examining the identification code.

The lead-in area 125 is generally bounded by circles 120 (23.5 mm in radius) and 130 (24 mm in radius). The width of the lead-in area 125 in the radial direction is thus 1.7 mm.

Note that the starting and ending radii of the lead-in area for other types of optical discs may differ. For example, for CD-R (Compact Disc Recordable), the starting and ending radii for the leading area generally are 23 mm and 25 mm, respectively. The hole 12 in this embodiment is a circle having a diameter of about 5 millimeters (mm) covering parts of circles 120 and 130, so that at least part of the lead-in data is removed.

There are a number of content data sections, which are provided on the lead-in area of a DVD, which a playback machine looks for. A selection of such possible data sections are listed immediately below by the type of information and the size of the respective information, as follows:

book type-4 bits, e.g., DVD-ROM, DVD-R, etc.;
book version-4 bits, e.g., version 1.0;
disc size-4 bits, e.g., 80 mm, 120 mm;
minimum data rate, 4 bits, e.g., 2.52, 5.04, 10.08 Mbps;
number of layers, 2 bits, e.g., 1, 2;
track path-1 bit, e.g., PTP, OTP;
layer type, 4 bits, e.g., read, write-one, write-many;
linear density-4 bits, e.g., 0.267, 0.293 μm/data bit;
track density-4 bits; e.g., 0.74 μm/track;
starting sector number-3 bytes, e.g., 030000h;
ending sector number-main layer-3 bytes;
ending sector number other layers, 3 bytes;
BCA flat-1 bit;
copyright protection system-1 byte;
region management flags-1 byte, 1 bit per region of 8 regions;
encryption data-2048 bytes;
manufacturing data-2048 bytes, 1 per layer, and content provider information of 28,672 bytes.

Note that in this embodiment, the above control data is repeated in 192 blocks. A player, however, generally, reads the data from all blocks, and proceeds to read other portions only if the access to all 192 blocks is successful.

The data sectors on a DVD ROM can essentially contain any types of data in any format. Officially, the OSTA UDF file format standard is mandatory and defines specific ways in which the ISO 13346 volume and file structure standard is applied for specific operating systems.

UDF limits ISO 13346 by making multivolume and multipartition support optional, defining file name translation algorithms and defining file name translation algorithms and defining extended attributes such as MacOs file/creator types and resource forks. UDF provides information specific to DOS™ OS/2™, Macintosh™, Windows 95™, Windows NT™, and UNIX™. On top of the UDF limitations, the DVD-ROM standard requires that the logical sector size and logical block size by 2048 types.

The above data or specifications do not form an essential part of the present invention but are presented for completeness as examples of information which can be provided by what is characterized herein as the TOC of an optical disc, which may be required to be read by the optical disc reader in order for the optical disc to be properly read and played. If such information is not read or readable, then the optical disc will not be readable by a playback machine even though the data written to the rest of the optical disc may be readable. The inability of the machine to read the data specifications will force the disc reader to malfunction in ways specific to the machine. However, in any such event, the machine will not read the optical disc. This is not to say that there may not be special reading machines, which can overcome these obstacles, but these are specialized machines not immediately or readily available to consumers in their homes or autos.

However, only a small portion of the lead-in area 125 includes useful information. The lead-in area 125 generally includes two sets of useful information: a reference code having a size of two blocks and control data having a size of 192 blocks. Each block consists of about 36 kilobytes (KB). The control data in the lead-in area 125 is about 7000 KB. Using the data that the average bit length of a single-sided single layer DVD normally is 133.33 nanometers (nm), one can compute that the control data in the lead-in area 125 uses about 7,400 mm of the spiral 16. Since the radius of the control data is approximately the radius of the circle 130 or 24 mm, the portion of the spiral used by the control data is equivalent to about 50 revolutions of the spiral 16. For a standard DVD, the average track pitch of about 0.74 micrometers (um). Thus, the 50 revolutions used by the control data are equivalent to an area of about 0.04 mm in width radially. Applying the similar data above, the two-block reference code would use less than one revolution of the spiral 16. Thus, the hole 12 may not damage the reference code because it may not locate at the portion of the spiral 16 used by the reference code. On the other hand, since the control code uses more than one revolution of the spiral 16, the hole 12 should have rendered the control code unreadable because those revolutions should have been discontinued by the hole 12.

In accordance to the principles of the invention, the hole 12 can be smaller for damaging the control data. The control data and the volume structure area (not shown) are separated by 32 blocks of zeros. The width in the radial direction of the area used by the 32 blocks is less than 0.01 mm. Thus, the control data is contained in the area starting from circle 130 going radially inward by about 0.05 mm. As such, the hole 12 can be as small as about 0.05 mm in diameter, as long as it covers the area starting from circle 130 and going inward by about 0.05 mm.

The volume structure area generally takes up 257 data sectors, each data sector consisting of 2,064 bytes. Thus, one can compute the number of revolutions in the spiral 16 needed for the volume structure area 125 is about 3.75, equivalent to a width in the radial direction of about 0.003 mm or 3 micrometers (um). Thus, the location of the spiral 16 used by the volume structure is very close to circle 130. The next area following the volume structure area is the file structure area (not shown). The size of the file structure is at least one data sector and depends on the contents of the DVD 10. In any case, the area is small and can be considered a part of the volume structure for the purpose of this application.

In light of the above analysis, the hole 12 may be so small as to cover only the volume structure area because a DVD player cannot proceed to read the contents if the DVD player is unable to read all the data in the volume structure area. For example, since the volume structure area uses more than one revolution of the spiral 16 and is in the area extended 0.003 mm radially outward from the circle 130, the hole 12 may just have a diameter of 0.003 mm outside the area bounded by the circle 130 and having a point of contact with circle 130. The hole 12 of course can cover up to the whole disc, or a radius of 60 mm in this illustrative embodiment, which is equivalent to an area of a width of 37.5 mm extending radially outward from the circle 120. Thus, the diameter of the hole 12 can range from about 3 micrometers (um) to 37.5 mm, but a maximum of 10 mm is preferred, so that the damaged DVD is still structurally sound to be stored for later analysis.

Although in this example, a circular hole is demonstrated, the damaged area can be in any shapes such as squares, triangles, rectangles, hexagons, pentagons, ellipses and other irregular shapes. No matter what the shape of the damaged area is, the longest width of the damaged area should range from about 3 um to 10 mm as in the circular shape case. The longest width in the circumferential direction should be at least ten times of the average pit length. In the exemplary DVD, the minimum longest width in the circumferential direction should be about 1.33 um.

Figure 2:
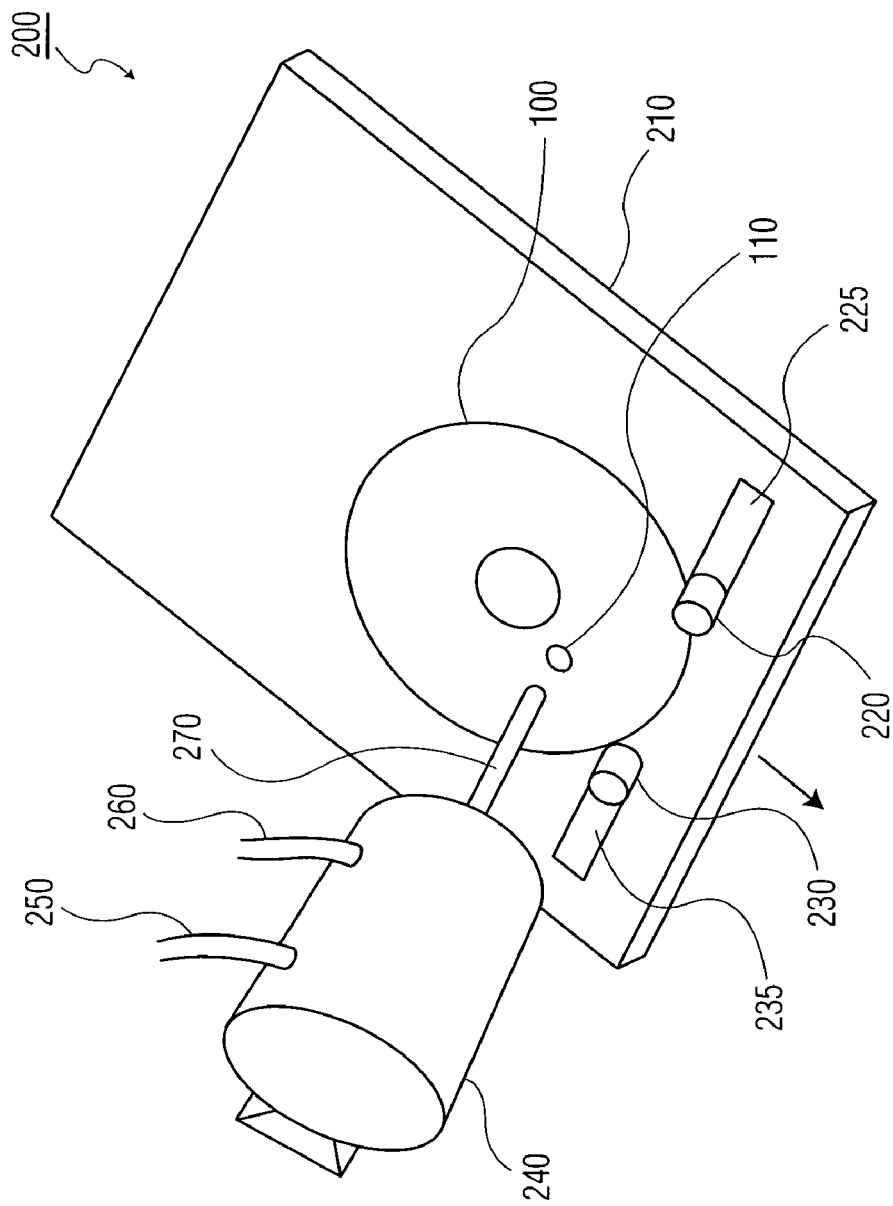
FIG. 2 illustrates an apparatus according to the principles of the invention for damaging a portion of the table of contents of an optical disc shown in FIG. 1.

FIG. 2 shows an exemplary machine for producing a disc shown on FIG. 1. The machine includes a feeder 210 for loading an optical disc 100, hold mechanisms 220 and 230 for holding the optical disc 100, and a damaging mechanism 240 for damaging the optical disc 100 in a pre-defined area 110 when the optical disc 10 is loaded to the feeder 210 and is ready to be damaged. The pre-defined area 110 is preferably located in such a manner that its geometric center forming a vertical line with the disc center of the optical disc 10. The damaging mechanism 240 and the feeder 210 are securely attached to a support structure (not shown), so that the damaging mechanism can damage the optical disc 100 in the pre-defined area 110. This pre-defined area 110 is fixed relative to the feeder 210, but is not fixed in the optical disc 100. Rather, the pre-defined area 110 is bounded by a pre-defined annulus (not shown) in the optical disc 100 and can be located anywhere in the annulus. The pre-defined annulus is the area bounded by two circles, for example, circles 120 and 130 in FIG. 1. As described before, the predefined annulus must include a portion of the table of contents. Since the exact location of the pre-defined area 110 in the pre-defined annulus is not important, the optical disc 100 can be fed to the feeder 210 without specific orientation. After the damaging mechanism has damaged the optical disc 100, the two hold mechanisms 220 and 230 slide outward along respective slots 225 and 235, causing the optical disc 100 to fall into a container (not shown), simply by gravity.

The feeder 210 is illustrated as inclined with respect to a vertical plane (not shown), so that the feeder 210 along with the hold mechanisms 220 and 230 can hold the optical disc 100 in place, ready to be damaged by the damaging mechanism. The feeder 210 also includes a hole (not shown) that allows the damaging mechanism (a punch in this illustration) to punch through the optical disc and to dispose the piece being punched out to another bin (not shown) through the hole. The angle of inclination preferably is 15 degrees. The feeder 210 may be disposed vertically but another holder (not shown) located on the top feeder 210 should be provided to hold the optical disc 100 in place, preventing the optical disc. 100 from falling.

The hold mechanisms 220 and 230 are illustrated as two posts spaced apart preferably by about 80 mm, when an optical disc is in place. The control (not shown) of two posts can be implemented by conventional method and is not described herein.

In this illustration, the damaging mechanism 240 is a punch, which includes a punch head 270. The punch head 270 is connected to a cylinder (not shown) in the main body of the punch 240. When compressed air is supplied to tube 250, the cylinder pushes the punch head 270 forward, punching out the predefined area 110. Other driving mechanism can be used as well such as hydraulic, solenoid, or other mechanisms that translate a rotational movement into a linear movement such as a motor with linkages or cams.

Although illustrating as a punch, the damaging mechanism 240 can be a drill for drilling out the pre-defined area 110, a laser source for removing the pre-defined area 110 by laser ablation, or a piercing mechanism for piercing through the pre-defined area 110. It can be a torch or a heat gun for distorting the clear layer or the reflective layer, or both in the pre-defined area 110 by heat. It can be a special gun for applying an opaque material on the pre-defined area 110.

Figure 3:
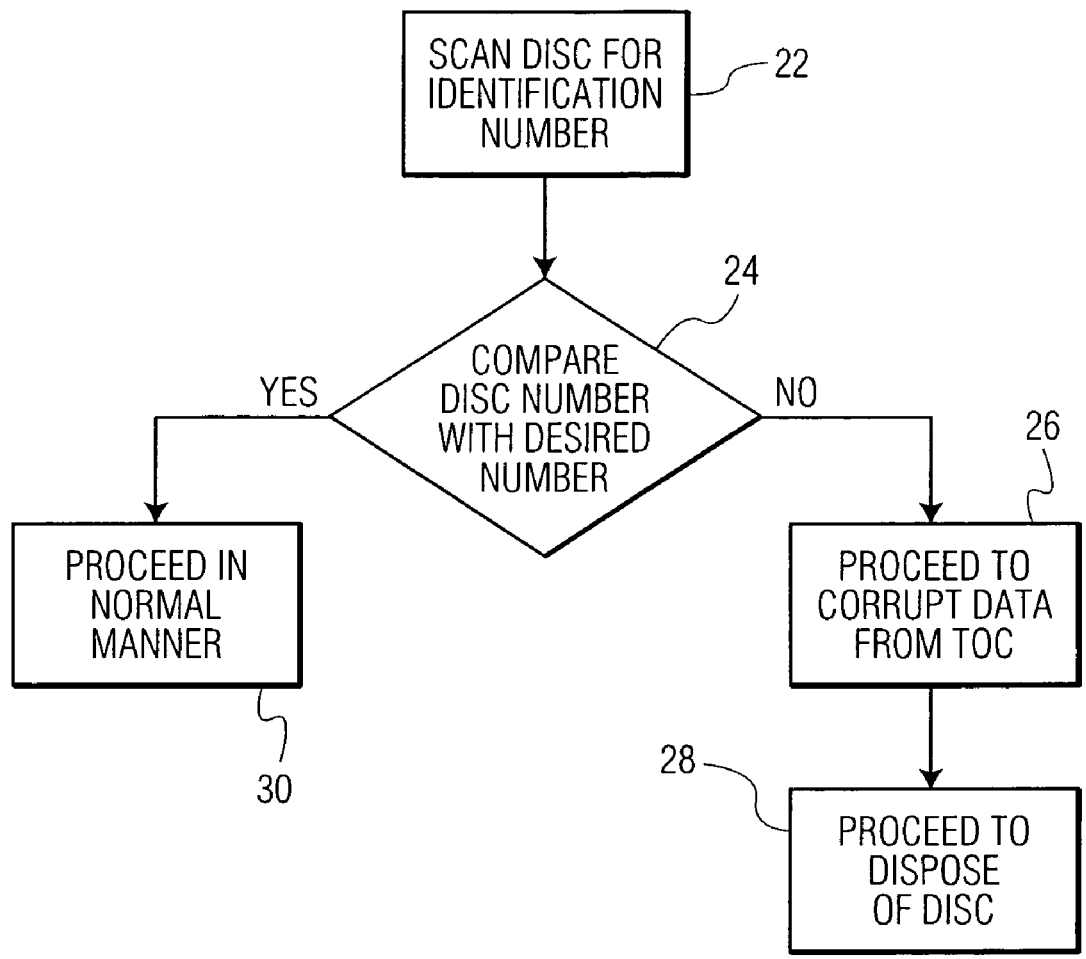
FIG. 3 shows a flow chart of the operation for separating conforming and non-conforming discs, and rendering the non-conforming discs unreadable according to the principles of the invention.

The method described above can be incorporated into a process in an assembly line for separating conforming and non-conforming optical discs, and render the non-conforming optical discs unreadable to an unintended user. FIG. 3 illustrates such a process. The identification code is scanned by optical means at 22 and compared at 24 with the code for the disc that is supposed to be presently processed by the assembly line (not shown). If disc 10 is not such a correct disc, then the incorrect disc can be directed, e.g., using a conveyer belt, shifted by hand, etc. to a production area set up for mutilating such wayward discs at 26 and 28.

One such production method would be to remove the gravity support for the disc, which is lying flat for optical confirmation of the identification code. If the identification code is wrong, a manual or computer controlled mechanism can cause the disc to fall and be guided into a slot (not shown) where it can be clamped in place with the portion of the TOC then being destroyed at 26 as discussed above, and the now corrupted disc being then permitted to slip downwardly by means of gravity into a pile of other similarly mutilated discs for subsequent disposal at 28. If at 24 disc 10 is a correct disc, then it is handled in a normal manner at 30.

This procedure is intended to improve the chances of an improper (non-conforming) optical disc not be improperly shipped. However, no procedure is foolproof and despite the above precautions, there is always a possibility of failure, however remote, that the optical disc, even with the corrupted TOC, may conceivably be shipped with the wrong shipment and in the wrong box, despite having an unmatched identification code. However, even in such an unlikely event, the present invention assures that the optical disc with the mutilated TOC will not be playable upon a viewer's playback machine.

While this invention has been described with regard to a few presently preferred embodiments, those skilled in this art will readily appreciate that many alternative modes and embodiments can be carried out without departing from the spirit and scope of this invention.

The invention claimed is:

1. An optical disc comprising:
   optical information written onto the optical disc, said information being readable by an optical source and an associated optical detector, the optical information including contents and a table of contents, wherein
   a portion of the table of contents is damaged, making the optical information not readable by the optical detector, wherein significant portion of the contents is undamaged.

2. The optical disc of claim 1, wherein the damaged portion is a hole.

3. The optical disc of claim 2, wherein the hole extends in the range of 3 micrometers to 10 millimeters radially.

4. The optical disc of claim 3, wherein the hole extends 5 millimeters radially.

5. The optical disc of claim 2, wherein the hole is circular in shape.

6. The optical disc of claim 2, wherein the hole extends at 1.33 micrometer circumferentially.

* * * * *